W. J. YOUNG.
MOTOR ROAD VEHICLE.
APPLICATION FILED FEB. 23, 1921.
1,404,506.
Patented Jan. 24, 1922.
4 SHEETS—SHEET 1.
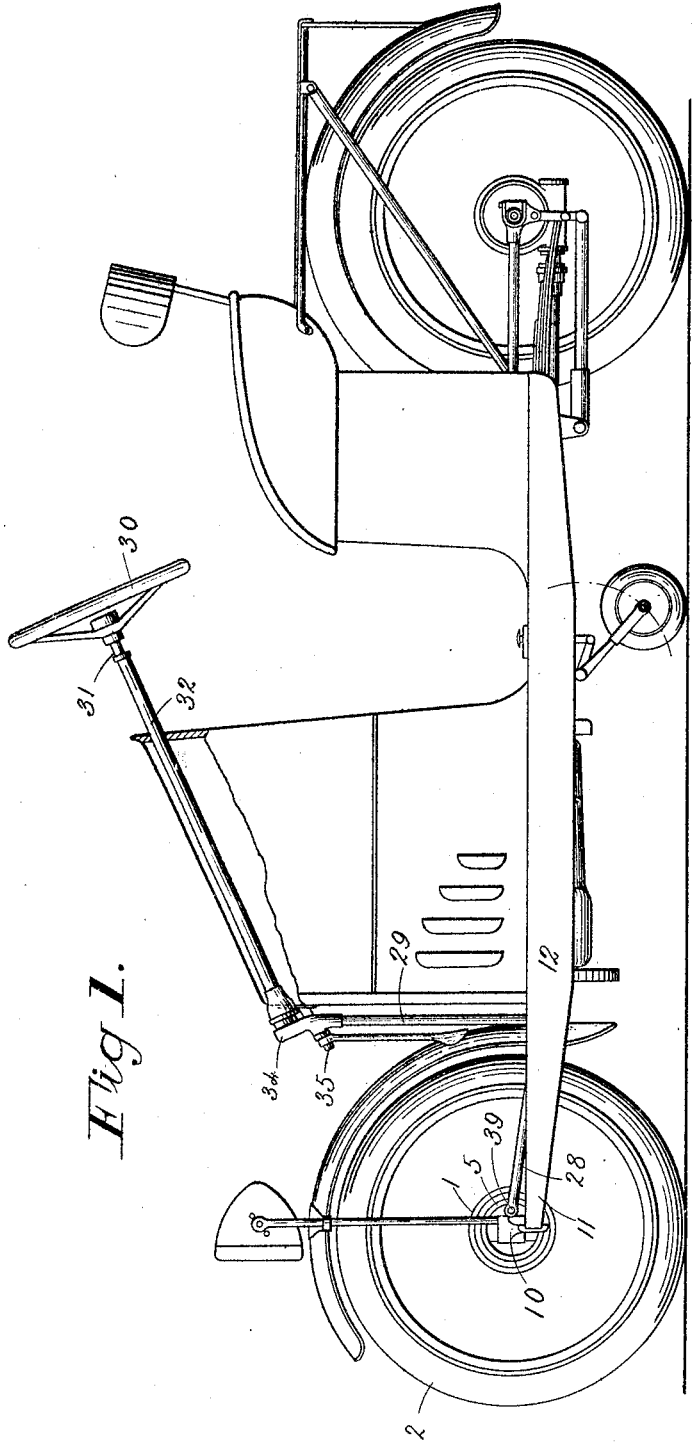
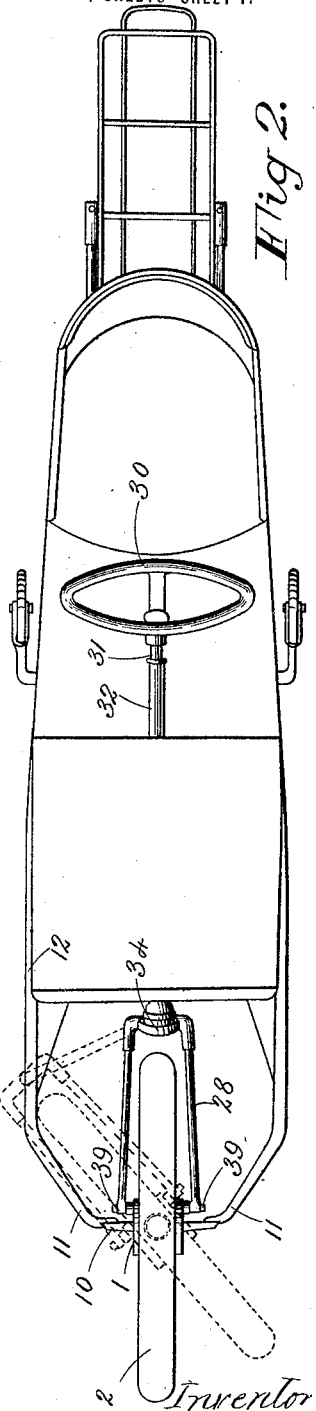
Inventor
William James Young
by Connolly Bro
Attys

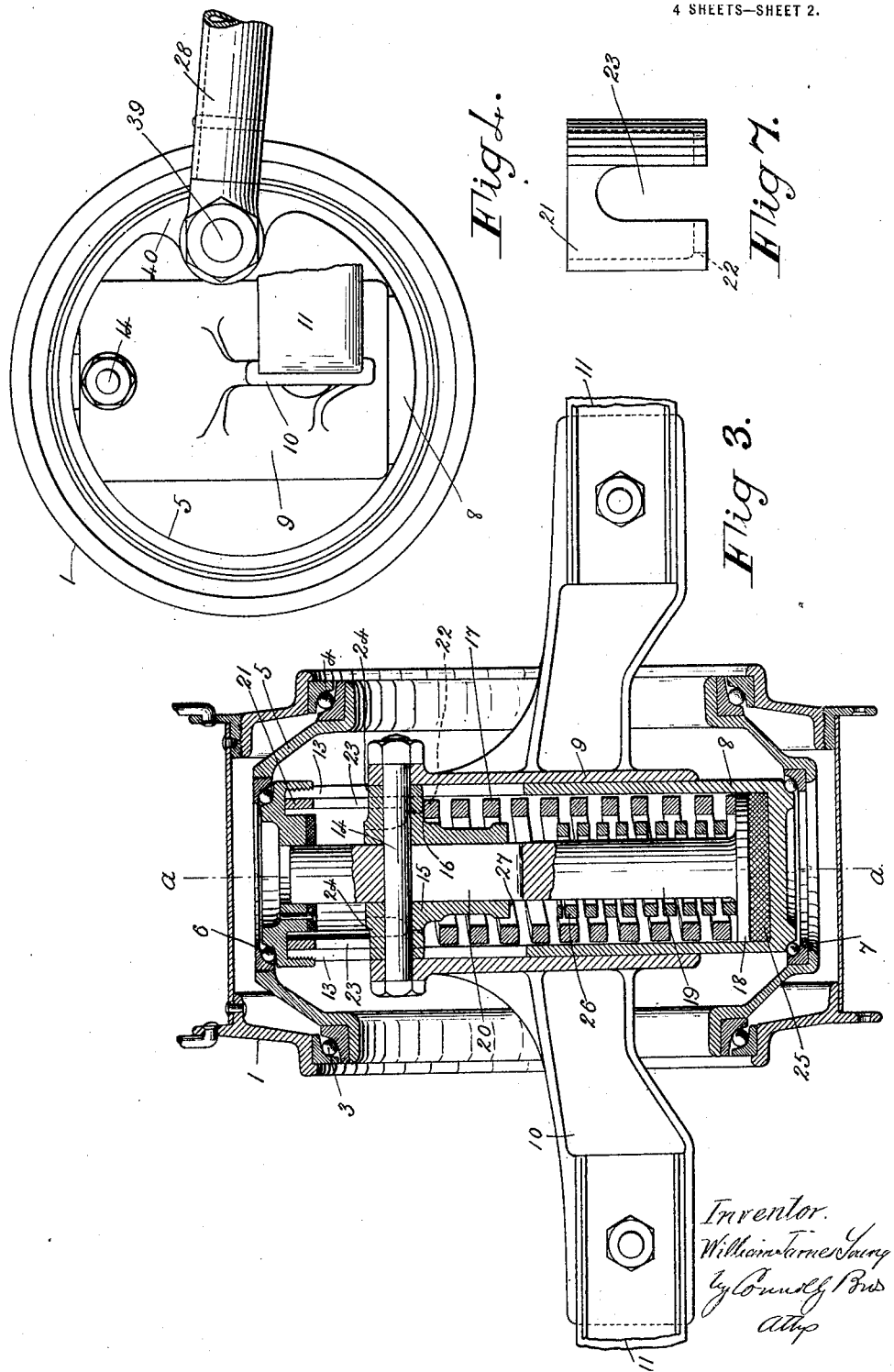

Inventor,
William James Young
by Connolly Bros
Attys

W. J. YOUNG.
MOTOR ROAD VEHICLE.
APPLICATION FILED FEB. 23, 1921.

1,404,506.

Patented Jan. 24, 1922.
4 SHEETS—SHEET 4.

Inventor.
William James Young,
by Connolly Bros.
Attorneys

UNITED STATES PATENT OFFICE.

WILLIAM JAMES YOUNG, OF LOUGHBOROUGH, ENGLAND.

MOTOR ROAD VEHICLE.

1,404,506. Specification of Letters Patent. Patented Jan. 24, 1922.

Application filed February 23, 1921. Serial No. 447,113.

*To all whom it may concern:*

Be it known that I, WILLIAM JAMES YOUNG, a subject of the King of Great Britain, residing at Loughborough, in the county of Leicester, England, have invented new and useful Improvements in or Relating to Motor Road Vehicles, of which the following is a specification.

This invention relates to motor road vehicles and comprises an improved wheel mounting and steering gear for a two wheeled or three wheeled motor vehicle such as a motor cycle, two wheeled car or cycle-car.

One feature of the invention is the mounting of the movable road wheel in such a manner that it turns, for steering purposes, on a vertical axis bearing situated within the hub of the wheel said bearing having combined therewith resilient shock absorbing means.

Another feature of the invention is the actuation of the movable road wheel, for steering purposes, by a gear or mechanism of the steering wheel type as will be hereinafter described.

The invention is mainly intended for application to and will be hereinafter described in connection with a two wheeled car wherein the rear wheel is driven and the front wheel is movably mounted and actuated in the manner above referred to for steering purposes.

According to the invention the movable wheel is supported by a case located within the hub and mounted to turn horizontally upon a member movable vertically and in a yieldingly controlled manner in a bearing carried by the frame of the machine.

To illustrate the invention a concrete embodiment of the same is shown in the accompanying drawings, wherein:—

Figure 1 is a side elevation, and

Figure 2 is a plan of a two wheeled car having the invention applied to the front wheel thereof.

Figure 3 is a vertical section of the front wheel hub and its bearing.

Figure 4 is a side view of the same.

Figure 7 is a side view of a part of the means shown in Figure 3.

Figures 1 and 2 are drawn to a smaller scale than the other figures, and throughout the drawings like parts are designated by the same reference characters.

Figure 6:
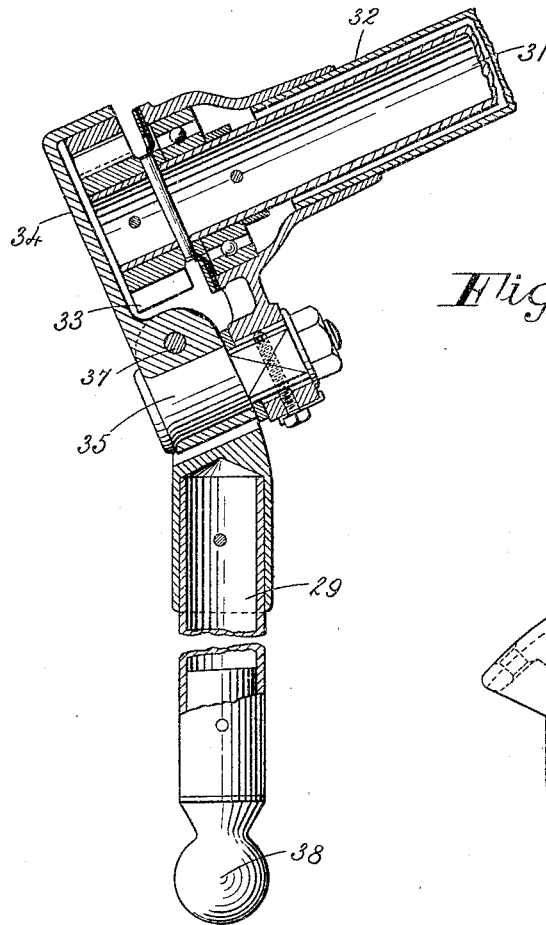
Figure 6 is a sectional side view of same.

In the form shown in the drawings, the hub 1 of the front wheel 2 is mounted by ball bearings 3 and 4 (Figure 3) on the outside of an annular case 5 which in turn is mounted by ball bearings 6 and 7 on the opposite ends of a central vertically disposed tubular housing 8. This housing 8 is slidable within a surrounding bearing 9 on a cross bar 10 fastened to the ends 11 of the chassis frame 12 (Figures 1 and 2). Passing transversely through the upper part of the bearing 9 and through slots 13 (Figure 3) formed longitudinally in the opposite sides of the tubular housing 8, is a pin 14 which carries on its centre part a block 15 having on its underside a shoulder 16 against which the top of a coil compression spring 17 situated in the housing 8 bears. The lower end of the said spring 17 is supported by the head or flange 18 on the lower end of a vertical rod 19 which has formed through it a slot 20 for the passage of the aforesaid transverse pin 14 by which the said rod is carried under normal conditions as shown in Figure 3.

Figure 8:
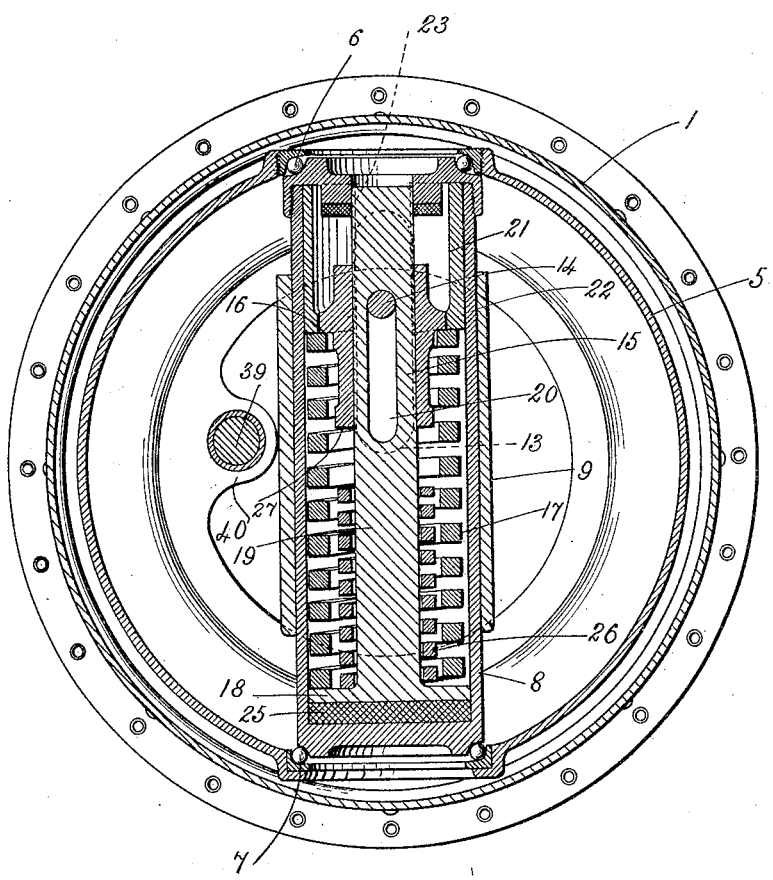
Figure 8 is a section on the line *a—a* of Figure 3.

Located inside the housing 8 at the top is a short sleeve 21 (Figures 3, 7 and 8) having a projecting shoulder 22 on the inside of its lower edge against the underside of which the upper end of the coil spring 17 bears. It should be noted that the said upper end of the spring 17 bears partly on the shoulder 16 and partly on the shoulder 22 as best seen in Figure 8. The sleeve 21 has vertical slots 23 in its opposite sides which coincide with the slots 13, both slots 13 and 23 being wide enough to allow the bosses 24 of the block 15 to pass therethrough and work up and down.

Normally the head or flange 18 of the rod 19 rests upon a pad 25 in the bottom of the housing 8. The load is taken by the coil spring 17 which is compressed between the head 18 as it rests within the housing, and the shoulder 16 on the block 15 during upward movement of the housing through the bearing 9 or during downward movement of the bearing on the housing. To serve as a cushion and assist the main coil spring 17 in taking the load, a supplementary coil compression spring 26 (Figures 3 and 8) is arranged within the main spring and located round the rod 19. This supplementary spring 26 is shorter than the main spring so that after the latter has been compressed to the extent of the space between the lower end 27 of the block 15 and the upper end of spring 26 compression of the latter between the end 27 and the head 18 commences its resistance augmenting that of the main spring. It will be understood that during upward movement of the housing 8 through the bearing 9 as just described, the rod 19 works through the block 15, and during downward movement of the bearing on the housing the block slides on the pin.

The recoil is also taken by the main compression spring 17 which, as the housing 8 moves down in the bearing 9 or the latter moves up on the housing, is compressed between the head 18 on the rod 19 and the shoulder 22 on the short sleeve 21 in the top of the housing, it being understood that during these movements the rod 19 is supported by the contact of the upper end of the slot 20 with the pin 14.

It will therefore be seen that the main coil spring is so arranged in association with the adjacent parts as to serve for absorbing both the road shocks and rebound.

The turning movements of the wheel on the steering pivot constituted by the housing 8 are effected and controlled by steering mechanism comprising a cradle or fork 28 (Figures 1 and 2) attached to the inner case 5 of the hub 1, a lever connection 29 to said fork operable by a toothed gear which in turn is actuated by a wheel 30 and rotary shaft 31.

Figure 5:
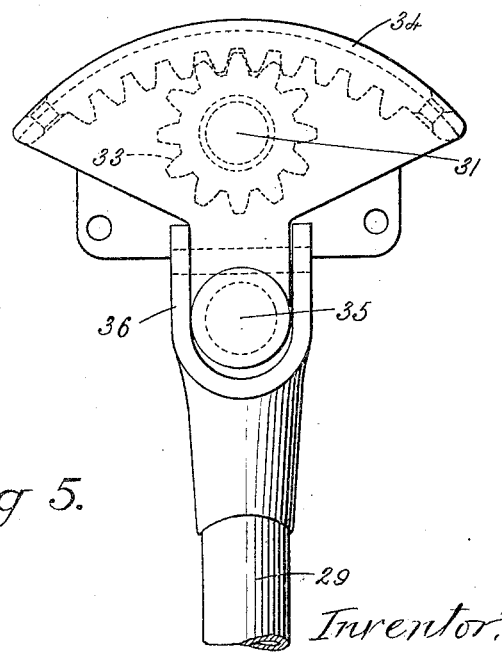
Figure 5 is a front view of part of the steering mechanism.

In a specific form of this part of the invention the shaft 31 fitted with the steering wheel 30 is arranged to be rotatable within a fixed tubular column 32. On the forward end of the shaft is a pinion 33 (Figures 5 and 6) working in mesh with an internally toothed quadrant 34 mounted to turn on a pivot 35 and having the lever connection 29 attached thereto. The lever is in the form of a rod having a bifurcated upper extremity 36 pivoted to the quadrant at 37 so that the rod can swing outwards while the quadrant and rod turn on the pivot 35. The lower end of the rod 29 is connected by a universal joint 38 with the rear end of the cradle or fork 28 the latter being substantially horizontally disposed with its limbs extending forwardly on opposite sides of the road wheel 2. The forward extremities of the fork 28 are pivotally attached at 39 (Figures 1, 2 and 4) to suitable bosses 40 on the inside of the inner case 5, the arrangement being such that by turning the steering wheel 30, the quadrant 34 and its attached rod 29 is rocked on the pivot 35 and thereby swings the rear end of the fork 28 round to right or left as may be required, as shown for example by dotted lines in Figure 2.

When the invention is applied to a three wheeled two-seater vehicle, in which case the steering wheel and column are situated toward one side of the vehicle instead of central as in the case of a two-wheeled single seated machine, the lever connection of the quadrant may be connected to the steering fork by means of an intermediate horizontal coupling rod of any suitable form. Or other intermediate actuating means may be employed between the shaft and steering fork.

What I claim then is:—

1. A motor road vehicle provided with a movable road wheel, a case on which the hub of said wheel is rotatably mounted, a vertical tubular housing on which said case is mounted to turn horizontally, a bearing in which said housing is movable vertically, said case, housing and bearing being located within the wheel hub, a coil compression spring located within the tubular housing adapted to control the relative movements of said housing and bearing in both directions, and a supplementary coil compression spring arranged within the aforesaid compression spring adapted to operate after an initial compression of the latter for the purpose of assisting the same and serving as a cushion.

2. A motor road vehicle provided with a movable road wheel, a case on which the hub of said wheel is rotatably mounted, a vertical tubular housing on which said case is mounted to turn horizontally, a bearing in which said housing is movable vertically, said case, housing and bearing being located within the wheel hub, a transverse pin through the bearing, a block thereon, a headed rod suspended from said transverse pin and located within the housing, a coil compression spring on said rod bearing at one end against the head thereof, and at the other end against the block on the transverse pin, a second coil compression spring located within but shorter than the first spring, and a shouldered sleeve situated in the upper end of the tubular housing adapted to bear upon the upper end of the first coil spring.

In testimony whereof I have signed my name to this specification.

WILLIAM JAMES YOUNG.